United States Patent
Umeyama et al.

(10) Patent No.: US 6,887,083 B2
(45) Date of Patent: May 3, 2005

(54) MODEL FOR TRAINING OF SURGICAL OPERATION OF CATARACT

(76) Inventors: Hideki Umeyama, 2-2-10-403, Nogakiuchi-machi, Yamato-koriyama-shi, Nara-ken (JP); Naomi Nakaki, 2-19-105, Higashi-shinmachi, Ikoma-shi, Nara-ken (JP)

( * ) Notice: Subject to any disclaimer, the term of this patent is extended or adjusted under 35 U.S.C. 154(b) by 0 days.

(21) Appl. No.: 09/834,886

(22) Filed: Apr. 16, 2001

(65) Prior Publication Data

US 2002/0028429 A1 Mar. 7, 2002

(30) Foreign Application Priority Data

Jun. 5, 2000 (JP) .................................. 2000-167371

(51) Int. Cl.$^7$ ................................................ G09B 23/28
(52) U.S. Cl. ........................................ 434/271; 434/267
(58) Field of Search ................................. 128/898, 899; 434/262, 267, 270, 271, 295, 296, 297

(56) References Cited

U.S. PATENT DOCUMENTS

| | | | | |
|---|---|---|---|---|
| 3,589,363 A | * | 6/1971 | Banko et al. ................. 604/22 |
| 4,919,151 A | * | 4/1990 | Grubbs et al. ............... 128/898 |
| 5,080,111 A | * | 1/1992 | Pallin .......................... 128/898 |
| 5,130,353 A | * | 7/1992 | Fischer et al. ................. 524/43 |
| 5,163,843 A | * | 11/1992 | Brenner ....................... 434/271 |
| 5,627,162 A | * | 5/1997 | Gwon et al. ................... 514/54 |

OTHER PUBLICATIONS

Sugiura et al, Journal of Cataract & Refractive Surgery, "Creating cataract in a pig eye", vol. 25, No. 5, May 1999.*
Wilder, Elizabeth, NCSU Chemical Engineering, Statistical Thermodynamics, "Polymer Gelation Due to the Self–Assembly of Dibenzylidene Sorbitol and Its Derivatives ", Jun. 1999.*
Sugiura et al, Journal of Cataract & Refractive Surgery, "Creating cataract in a pig eye ", vol. 25, No. 5, May 1999.*

\* cited by examiner

*Primary Examiner*—Kurt Fernstrom
(74) *Attorney, Agent, or Firm*—Sherman & Shalloway

(57) ABSTRACT

The present invention relates to a model for surgical operation for an eye with cataract comprising a pig's eye which is prepared by injecting self hardening type chemicals into a crystalline lens capsule or into an empty crystalline lens capsule of said pig's eye, further relates to a model for an enucleating operation of a fallen nucleus lens which is prepared by falling the hardened chemicals into corpus vitreum by breaking posterior capsule of crystalline lens consciously.

10 Claims, 3 Drawing Sheets

Figure 2A:
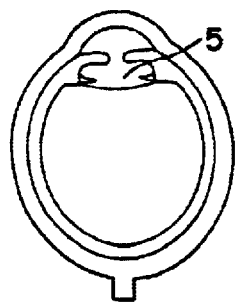

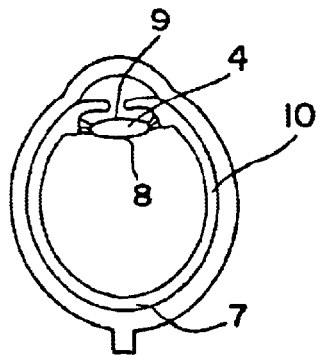
FIG. I(a)
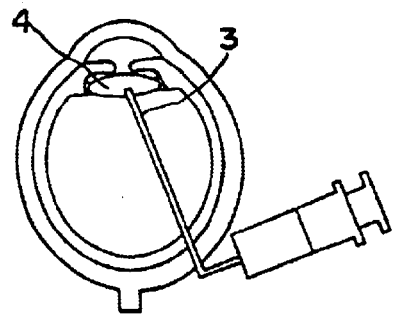
FIG. I(b)
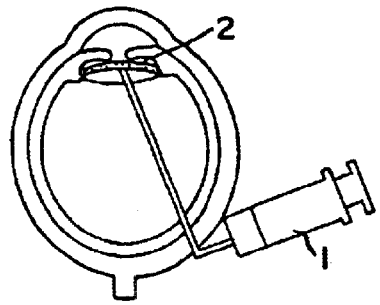
FIG. I(c)
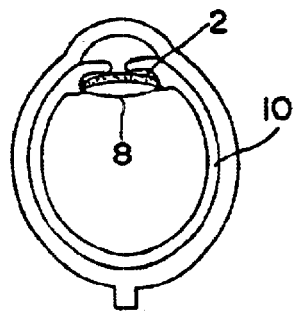
FIG. I(d)

MODEL FOR TRAINING OF SURGICAL OPERATION OF CATARACT

FIELD OF THE INVENTION

The present invention relates to a model for training of surgical operation of cataract which is prepared to learn a skill and a technique for surgical operation of cataract of a human's eye including an enucleating operation of a nucleus lens fallen down into corpus vitreum.

DESCRIPTION OF THE PRIOR ART

The cataract of eye indicates the cloudy state of the crystalline lens of an eye, and is a main complaint of an eye sight injury or sight loss. The cataract of old aged people's eye is in the cataract of a human's eye. A method to extract a crystalline lens or a phacoemulsification and aspiration method can be mentioned as the concrete examples of methods for medical treatment. To learn a skill and a technique of a surgical operation of cataract, many exercises for surgical operation training are carried out.

In general, a pig's eye is used as a training model for a surgical operation of cataract of a human's eye, assuming that the pig's eye is the human's eye suffering from eye cataract. In this case, a pig's eye is taken off from a butchered pig, and the age of the butchered pig is about 6 to 8 months. However, a provided pig's eye from a young pig is not suffering from eye cataract. Further, since the tissue and hardness of a pig's eye are different from those of a human's eye, the conventional training method for a surgical operation of cataract that uses a pig's eye is different from the actual surgical operation of cataract for a human's eye.

Further, in a case of an enucleating operation, the falling down of a lens into corpus vitreum is considered to be the worst failure in the surgical operation of cataract. And, if the fallen lens is left as it is, it causes inevitably loss of sight, therefore, it is necessary to carry out an enucleating operation to enucleate the fallen nucleus lens immediately. However, nowadays, there is not an appropriate training model or training method to learn the technique of the enucleating operation.

BRIEF SUMMARY OF THE INVENTION

The inventors of this invention have conduced an intensive study to develop a training model by which an operation similar to a surgical operation of cataract of a human's eye and accomplished the present invention. Namely, the object of this invention is to provide a training model of cataract by which the feeling of an actual surgical operation for cataract of the old aged people and additionally an enucleating operation of a nucleus lens fallen into corpus vitreum can be learned.

The important point of this invention is a training model for a surgical operation of cataract comprising a pig's eye which is prepared by injecting self hardening type chemicals into a crystalline lens capsule of said pig's eye, or a training model for a surgical operation of cataract comprising a pig's eye which is prepared by injecting self hardening type chemicals into an empty crystalline lens capsule of said pig's eye. Further, another important point of this invention is a training model for a surgical operation of cataract comprising a pig's eye in the corpus vitreum of which a false nucleus of cataract prepared by injecting self hardening type chemicals into an empty crystalline lens capsule of said pig's eye is existing.

That is, the present invention is the training model for a surgical operation of cataract having similar hardness to the hardness of an old aged people's eye with cataract prepared by injecting a self hardening type chemicals into a capsule of crystalline lens of pig's eye or prepared by making a capsule of crystalline lens of pig's eye empty then injecting a self hardening type chemicals into the empty capsule of crystalline lens of pig's eye. And, this training model for a surgical operation of cataract can be also used as a training model for enucleating operation to enucleate a fallen nucleus lens from the corpus vitreum, assuming the case when the nucleus lens is fallen down into corpus vitreum by error during the enucleating of nucleus lens from the capsule.

BRIEF ILLUSTRATION OF THE DRAWINGS

FIG. 1(a)–FIG. 1(d) are drawings illustrating the preparation process of a model of eye with cataract of this invention.

FIG. 2(a)–FIG. 2(d) are drawings illustrating another preparation process of a model of eye with cataract of this invention.

Figure 3A:
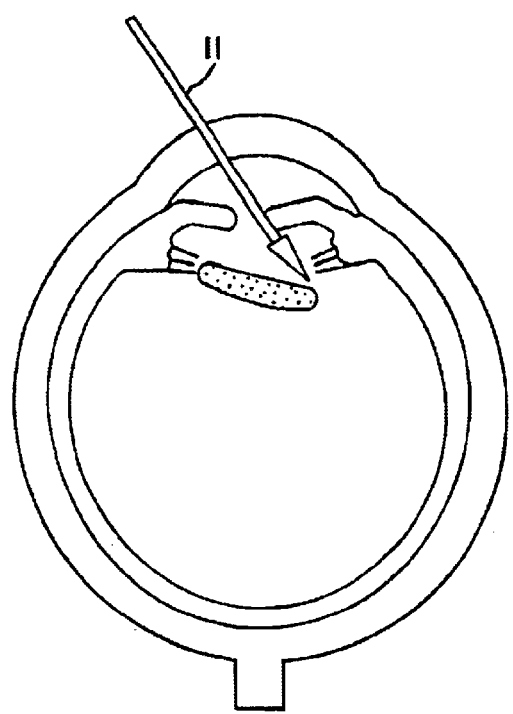
Figure 3B:
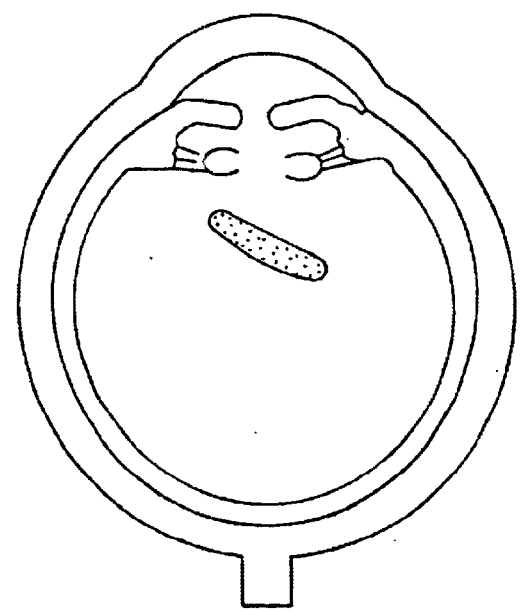

FIG. 3(a) and FIG. 3(b) are drawings illustrating the preparation process of a fallen cataract nucleus lens of this invention.

In the drawings, each numerical numbers indicate, 1: syringe 2: chemicals 3: 27G dull needle 4: crystalline lens 5: empty crystalline lens capsule 6: chemicals 7: sclera of posterior pole of eyeball 8: posterior capsule of crystalline lens 9: anterior capsule of crystalline lens 10: sclera 11: scalpel for sclera

DETAILED DESCRIPTION OF THE INVENTION

The detail of this invention will be illustrated more readily.

The training model used in the present invention is made of a pig's eye. As mentioned above, a pig's eye is taken from a butchered pig. Generally, a pig's eye for training model are provided from young pigs of about 6 to 8 months age, however, in the present invention, the pig's eye for training model is not restricted to the young butchered pig's eye.

In the present invention, the self-hardening type chemicals are injected into a capsule of crystalline lens, and there are two methods of this invention. That is, the method to inject the chemicals into a capsule of crystalline lens and the method to inject the self hardening type chemicals into an empty capsule of crystalline lens from which the whole contents are taken out. Further, as another case, the method to make the hardened chemicals fall down into corpus vitreum and make exist it in corpus vitreum by breaking capsule of crystalline lens consciously at the point when the injected chemicals into an empty crystalline lens capsule is hardened can be mentioned. In this case, the hardened chemicals are called as the false nucleus of cataract.

The self hardening type chemicals to be injected into a capsule of crystalline lens of pig's eye or into an empty capsule of crystalline lens from which the contents is taken out is a chemical which has a gelling function and indicates the similar hardness to the hardness of an old aged people's eye with cataract. As the concrete example of said chemicals, the materials mainly composed of dibenzylidenesorbitol or derivatives of it, polyhydric alcohol such as glycerin or coloring pigment can be mentioned. Dibenzylidenesorbitol is a condensed product of benzaldehyde and sorbitol. Nuclear substitution products of benzaldehyde, such as methylbenzaldehyde or sorbitol condensed product of ethyl benzaldehyde have same gelling function. Further, xylitol, which is a kind of sugar alcohol represented by sorbitol, and dibenzylidenxylitol has also same gelling function. All of these mentioned materials are the self hardening type chemicals. It is desirable to use a chemical mainly composed of dibenzylidenesorbitol from the view point of the environment contamination and the security of the human body.

These mentioned chemicals can be used by itself, however, in general, it is desirable to be used as a composition composed mainly of said chemicals. As an additive, it is desirable to use water soluble cellulose type resin for the purpose to provide elasticity to gel. Further, as the solvent of said chemicals it is desirable to use polyhydric alcohol such as glycerin and/or non protic solvent that can be mixed with water contained in pig's eye or body fluid by voluntarily ratio. The composition dissolving above mentioned self hardening type chemicals into said solvent is preferably used. The typical example of the composition is mentioned in Table 1.

TABLE 1

| dibenzylidenesorbitol | 10 weight parts |
|---|---|
| water soluble cellulose type resin | 0.2 weight parts |
| glycerin | 60 weight parts |
| N-methyl-2-pyrrolidone | 29.8 weight parts |

For the purpose to emphasize the effect of the operation, it is possible to use a pigment. As the pigment, any kind of water-soluble dye or food dye can be used.

Figure 2B:
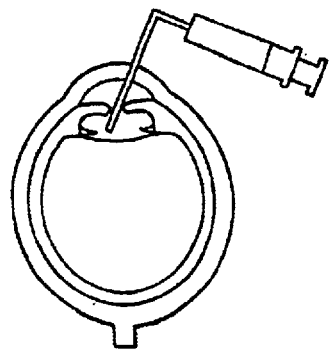
Figure 2C:
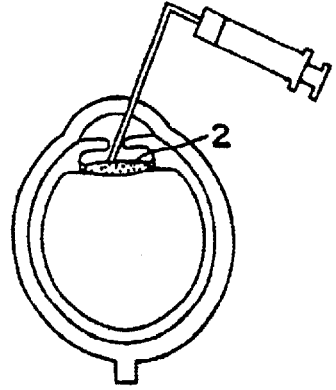
Figure 2D:
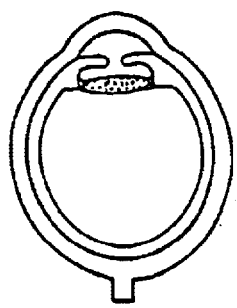

The detail of the present invention is more readily illustrated by the drawings. FIG. 1 and FIG. 2 are the explanatory drawings of the present invention. FIG. 1a to FIG. 1e are the drawings illustrating a case to inject the chemicals into a capsule of crystalline lens, and FIG. 2a to FIG. 2e are the drawings illustrating a case to inject the chemicals into an empty capsule of crystalline lens from which the whole contents is taken out. FIG. 3a and FIG. 3b are the drawings illustrating a case which make the self hardened chemicals (false nucleus of cataract) after injected as illustrated by FIG. 2d and FIG. 2e fall into corpus vitreum by breaking posterior capsule of crystalline lens consciously.

FIG. 1a is a drawing illustrating to expose sclera (10) of a pig's eye from which organism such as outer muscle of eyeball or tennon capsule are cut off. The sclera of posterior pole of eyeball (7) of pig's eye in such a condition is bored by a piercing scalpel. The self-hardening type chemicals (2) is then filled up in a cylinder of syringe (1) to which a 27G dull needle (3) is attached. Then said needle of syringe is inserted to a pig eye through an injury arranged previously by thrusting to the sclera of posterior pole of eyeball. Then a posterior capsule of crystalline lens (8) is thrust and stopped just under the anterior capsule (9) (refer to FIG. 1b). After that, as shown in FIG. 1c, at the position just under the anterior capsule, when chemicals contained in a cylinder of syringe is injected into anterior capsule of crystalline lens, the chemical substance is spread circularly (drawn by oblique lines). After several minutes pass, the chemicals are hardened by itself, and a pig's eye with cataract just like a human's eye with cataract can be obtained (refer to FIG. 1d).

Secondly, a method to inject self hardening type chemicals after contents in crystalline lens are taken off is illustrated. At the first stage, as shown in FIG. 2a, an anterior capsule (9) of pig's eye is circularly cut off previously, and the whole contents in crystalline lens are removed by a phacoemulsification and aspiration apparatus. Then, as shown in FIG. 2b, self hardening type chemicals (6) are injected into the empty crystalline lens capsule (5) by means of above mentioned syringe (1) (refer to FIG. 2c). After leaving it for 5 to 10 minutes, a pig's eye with cataract just like a human's eye with cataract can be obtained (refer to FIG. 2d).

By a model eye with cataract prepared as above, a sham operation of incision for anterior capsule or a sham operation of a phacoemulsification and aspiration method can be carried out as if it is a human's eye with cataract. Further, if dye agent or pigment is used at the incision of an anterior capsule of a pig's eye, a sham incising operation can be easily carried out.

The chemicals (2) used in the case of FIG. 1 which is injected into crystalline lens capsule and the chemicals (6) used in the case of FIG. 2 which is injected into the empty crystalline lens capsule from which whole contents are taken off can be the same substance, or the different substance to which glycering or pigments are added by various ratio can be voluntarily used.

The case to make the false nucleus of cataract hardened in a capsule of crystalline lens fall down and exist in corpus vitreum by breaking the posterior capsule of crystalline lens will be illustrated as follows. As illustrated in FIG. 2a, the anterior capsule of crystalline lens (9) of pig's eye is excised by circular shape and the contents of lens is removed using a phacoemulsification and aspiration apparatus beforehand. Then, the self hardening chemicals (6) is injected into the empty capsule of crystalline lens (5) as illustrated by FIG. 2b using a syringe (1) (refer to FIG. 2c). After 5 to 10 minutes, a pig's eye with cataract similar to human's eye with cataract can be obtained (refer to FIG. 2d). When the posterior capsule of crystalline lens possessing a false nucleus of cataract inside obtained as above is broken by a scalpel for sclera (11), said false nucleus of cataract looses the support by posterior capsule and falls down into corpus vitreum because of it's weight as shown in FIG. 3a, and becomes to exist in the corpus vitreum (refer to FIG. 3b). By using the false nucleus of cataract fallen into corpus vitreum, the training of enucleating operation to enucleate a fallen nucleus lens from the corpus vitreum by using a corpus vitreum excising apparatus becomes possible. That is, the enucleating operation to enucleate a fallen nucleus lens from the corpus vitreum is the operation to treat the fallen nucleus of cataract into corpus vitreum by an operation error using a corpus vitreum excising apparatus, and the technique of this operation can be learned by using the training model of this invention.

Effect of the Invention

By changing variously the constitution ratio and the hardening time of the self-hardening type chemicals (2) and (6), models of eye with cataract which have various properties from soft kernel to hard kernel can be prepared. Further, by breaking a posterior capsule, the condition that the nucleus crystalline lens is existing in corpus vitreum can be prepared. Therefore, every eye surgical doctors including experienced ones and inexperienced young ones can improve their skill and technique for the actual operation of human's eye with cataract, by use of the model of pig's eye with cataract of this invention.

Further, by this method, after sham training operation using above mentioned model, the recycle use of the used pig's eye model by injecting a self hardening type chemicals again becomes possible. In the meanwhile, the development and improvement of an instrument or an apparatus for the surgical operation of eye with cataract become possible by use of the model of eye with cataract prepared as above.

What is claimed is:

1. A model for cataract surgery, comprising:

a pig's eye which is prepared by injecting a self hardening chemical, said self hardening chemical being dibenzylidenesorbitol, a water soluble cellulose resin, glycerin and N-methyl-2-pyrrolidone into a crystalline lens capsule of said pig's eye wherein said crystalline lens capsule of said pig's eye is empty.

2. The model for cataract surgery of claim 1, wherein the self hardening chemical is injected from the posterior pole of said pig's eye.

3. The model for cataract surgery of claim 1, wherein said crystalline lens capsule of pig's eye is emptied by phacoemulsification.

4. The model for cataract surgery of claim 1, wherein said crystalline lens capsule of pig's eye is emptied by aspiration.

5. A model for cataract surgery in the corpus vitreum, wherein a false nucleus of a cataract is prepared by injecting a self hardening chemical, said self hardening chemical being dibenzylidenesorbitol, a water soluble cellulose resin, glycerin and N-methyl-2-pyrrolidone into an empty crystalline lens capsule of a pig's eye wherein said crystalline lens capsule of said pig's eye is empty.

6. The model for cataract surgery of claim 5, wherein said crystalline lens capsule of pig's eye is emptied by phacoemulsification.

7. The model for cataract surgery of claim 5, wherein said crystalline lens capsule of pig's eye is emptied by aspiration.

8. A method of using a pig's eye having an empty crystalline lens capsule, comprising the step of:

injecting a self hardening chemical, said self hardening chemical being dibenzylidenesorbitol, a water soluble cellulose resin, glycerin and N-methyl-2-pyrrolidone into an empty crystalline lens capsule of the pig's eye.

9. The method of claim 8, wherein said crystalline lens capsule of pig's eye is emptied by phacoemulsification.

10. The method of claim 8, wherein said crystalline lens capsule of pig's eye is emptied by aspiration.

* * * * *